United States Patent
Choi et al.

(10) Patent No.: US 11,027,575 B2
(45) Date of Patent: Jun. 8, 2021

(54) BICYCLE WHEEL AND METHOD OF MANUFACTURING BICYCLE WHEEL

(71) Applicants: HYUNDAI MOTOR COMPANY, Seoul (KR); KIA MOTORS CORPORATION, Seoul (KR)

(72) Inventors: Jungnam Choi, Seongnam-si (KR); Sung Dae Lim, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 5 days.

(21) Appl. No.: 16/530,266

(22) Filed: Aug. 2, 2019

(65) Prior Publication Data
US 2019/0351700 A1 Nov. 21, 2019

Related U.S. Application Data

(62) Division of application No. 15/616,150, filed on Jun. 7, 2017, now Pat. No. 10,406,851.

(30) Foreign Application Priority Data

Dec. 14, 2016 (KR) .................. 10-2016-0170809

(51) Int. Cl.
- *B60B 1/00* (2006.01)
- *B60B 5/02* (2006.01)
- *B60B 1/02* (2006.01)

(52) U.S. Cl.
CPC ............... *B60B 1/003* (2013.01); *B60B 1/02* (2013.01); *B60B 5/02* (2013.01)

(58) Field of Classification Search
CPC .. B60B 1/003; B60B 1/02; B60B 5/02; B60B 1/041; B60B 2310/211; B60B 2310/208;
(Continued)

(56) References Cited

U.S. PATENT DOCUMENTS

| 5,762,405 A | 6/1998 | Dempsey |
| 6,367,883 B1 | 4/2002 | Chen |

(Continued)

FOREIGN PATENT DOCUMENTS

| DE | 3528595 A1 * | 2/1987 | ............ B60B 23/10 |
| GB | 190227095 A * | 3/1904 | |
| GB | 190417145 A * | 6/1905 | |

OTHER PUBLICATIONS

Machine Translation of DE3528595A1 by Wackenhut. "Road wheel for bicycles or motor cycles and the like". Feb. 19, 1987.*

(Continued)

*Primary Examiner* — David P Bryant
*Assistant Examiner* — Nirvana Deonauth
(74) *Attorney, Agent, or Firm* — Morgan, Lewis & Bockius LLP

(57) ABSTRACT

A bicycle wheel includes a first panel member including a first rim portion for mounting a tire, a first hub mounting end connected to a hub, a first spoke portion for connecting the first rim portion and the first hub mounting end, a second panel member having a second rim portion for mounting the tire, a second hub mounting end connected to the hub, and a second spoke portion for connecting the second rim portion and the second hub mounting end, wherein the bicycle wheel is formed by joining the first panel member and the second panel member together such that the first panel member and the second panel member are symmetrical to each other about a line passing through the hub and the rim.

7 Claims, 4 Drawing Sheets

(58) Field of Classification Search
CPC ...... B60B 2310/2082; B60B 2310/312; B21D 53/265; B21D 53/268; B21D 53/30; B21K 1/34; B21K 1/38; B21K 1/40
See application file for complete search history.

(56) References Cited

U.S. PATENT DOCUMENTS

| | | |
|---|---|---|
| 6,899,400 B1 | 5/2005 | Cook |
| 7,475,950 B1 | 1/2009 | Glenn |
| 2004/0177910 A1 | 9/2004 | Chen |
| 2014/0001820 A1 | 1/2014 | Kismarton et al. |
| 2014/0152080 A1 | 6/2014 | Koshiyama |

OTHER PUBLICATIONS

Notice of Allowance issued in U.S. Appl. No. 15/616,150 dated May 2, 2019.
Non-Final Office Action issued in U.S. Appl. No. 15/616,150 dated Jan. 2, 2019.

* cited by examiner

BICYCLE WHEEL AND METHOD OF MANUFACTURING BICYCLE WHEEL

CROSS-REFERENCE TO RELATED APPLICATION

This application is the divisional of U.S. patent application Ser. No. 15/616,150 filed Jun. 7, 2017, now allowed, which claims the benefit of priority to Korean Patent Application No. 10-2016-0170809, filed with the Korean Intellectual Property Office on Dec. 14, 2016, the entire contents of which are incorporated herein by reference.

TECHNICAL FIELD

The present disclosure relates to a bicycle wheel and a method of manufacturing the bicycle wheel, and more particularly, to a bicycle wheel which improves productivity and marketability, and a method of manufacturing the bicycle wheel.

BACKGROUND

In general, a bicycle includes a frame including a body, a handle, a saddle, and front and rear wheels (hereinafter, commonly called a 'wheel') which are installed at front and rear sides of the frame, respectively.

The wheel has a predetermined rigidity in order to support loads such as a weight of the bicycle, a weight of a user and a weight of a cargo as necessary.

The wheel may include a metallic rim which has an outer surface on which a tire is installed, a hub to which a rotating shaft of the wheel is coupled, and spokes which connect the hub and the rim.

However, because the spokes, which connect the hub and the rim, are a plurality of steel wires, in order to have predetermined tension, there is a problem in that it is difficult to install the spokes and the time and difficulty required to manufacture the wheel may be substantial.

In addition, since the spoke is made of metal, required rigidity may be reduced, but there is a problem of increased costs.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a bicycle wheel, which may improve design characteristics by manufacturing a clinching portion by press-molding a first panel member and a second panel member and then performing hemming processing, and a method of manufacturing the same.

The present disclosure has also been made in an effort to provide a bicycle wheel, which may reduce a time required for manufacturing and assembling processes by using a simple manufacturing method, and a method of manufacturing the bicycle.

Exemplary embodiments of the present disclosure provide a bicycle wheel including: a first panel member which has a first rim portion for mounting a tire, a first hub mounting end connected to a hub, and a first spoke portion for connecting the first rim portion and the first hub mounting end; and a second panel member which has a second rim portion for mounting the tire, a second hub mounting end connected to the hub, and a second spoke portion for connecting the second rim portion and the second hub mounting end, in which the bicycle wheel is formed by joining the first panel member and the second panel member together so that the first panel member and the second panel member are symmetrical to each other.

A rim may be formed by joining the first rim portion and the second rim portion together, the first hub mounting end and the second hub mounting end may be joined together and connected to the hub disposed at a rotation center, and a spoke may be formed by joining the first spoke portion and the second spoke portion together.

The bicycle wheel may further include: a first clinching portion which is bent from the first rim portion and prevents the tire from being withdrawn; and a second clinching portion which is bent from the second rim portion and prevents the tire from being withdrawn.

The first clinching portion and the second clinching portion may protrude inward so as to face each other.

The first panel member may further include a first reinforcing portion which is extended and bent from the first rim portion, and the second panel member may further include a second reinforcing portion which is extended and bent from the second rim portion.

Spaces may be formed between the first rim portion and the first reinforcing portion and between the second rim portion and the second reinforcing portion, respectively.

A rim joint portion, which joins the first panel member and the second panel member together, may be formed between the first rim portion and the first spoke portion and between the second rim portion and the second spoke portion, and the first reinforcing portion and the second reinforcing portion may be extended into the rim joint portion and coupled to each other.

A panel joint portion, which joins the first panel member and the second panel member together, may be formed between the rim and the hub, and the first reinforcing portion and the second reinforcing portion may be extended into the panel joint portion and coupled to each other.

The panel joint portion may be formed as a straight section at a set position between the rim and the hub.

A rim joint portion, which joins the first panel member and the second panel member together, may be formed between the first rim portion and the first spoke portion and between the second rim portion and the second spoke portion.

A panel joint portion, which joins the first panel member and the second panel member together, may be formed between the rim and the hub.

The panel joint portion may be formed as a straight section at a set position between the rim and the hub.

Exemplary embodiments of the present disclosure provide a method of manufacturing a bicycle wheel, the method including: forming a first rim portion, a first hub mounting end, and a first spoke portion on a first panel member by press molding, and forming a second rim portion, a second hub mounting end, and a second spoke portion on a second panel member by press molding; forming a first clinching portion and a second clinching portion, which protrude to one side, by bending the first panel member and the second panel member; and forming a rim by the first rim portion and the second rim portion by joining the first panel member and the second panel member together, mounting a hub by the first hub mounting end and the second hub mounting end, and forming a spoke including the first spoke portion and the second spoke portion between the rim and the hub.

The method may further include: forming a first reinforcing portion, which is extended and bent to be spaced apart from the first rim portion, in a state in which the first clinching portion is formed by bending the first panel member; and forming a second reinforcing portion, which is extended and bent to be spaced apart from the second rim portion, in a state in which the second clinching portion is formed by bending the second panel member.

The first reinforcing portion and the second reinforcing portion may be formed at positions corresponding to the rim.

The first clinching portion and the second clinching portion may be formed on the first panel member and the second panel member, respectively, by at least one processing method among cam press molding, press curl hemming processing, and roll hemming processing.

The first panel member and the second panel member may be joined together so that the first clinching portion and the second clinching portion are disposed to protrude inward.

The method may further include: joining the first panel member and the second panel member together by means of a rim joint portion formed at a lower end portion of the rim; and joining the first panel member and the second panel member together by means of a panel joint portion formed in a set section between the rim and the hub.

The first panel member and the second panel member may be joined together corresponding to the rim joint portion by $CO_2$ welding.

The first panel member and the second panel member may be joined together corresponding to the panel joint portion by any one joint method among bolting, riveting, and spot welding.

According to the exemplary embodiments of the present disclosure, the rim and the spoke are formed by press-molding each of the first panel member and the second panel member and then joining the first panel member and the second panel member together, and as a result, design characteristics may be improved, and manufacturing and assembling time may be reduced, thereby improving productivity.

In addition, according to the exemplary embodiments of the present disclosure, costs required for molds and manufacturing costs may be reduced in comparison with a technology of manufacturing a bicycle wheel by using the existing casting molding using carbon or the like.

In addition, the other effects obtained or expected by the exemplary embodiments of the present disclosure will be directly or implicitly disclosed in the detailed description of the exemplary embodiments of the present disclosure. That is, various effects expected according to the exemplary embodiments of the present disclosure will be disclosed in the detailed description to be described below.

DETAILED DESCRIPTION

Hereinafter, exemplary embodiments of the present disclosure will be described with reference to the accompanying drawings. However, the drawings illustrated below and the following description relate to merely some various exemplary embodiments for effectively explaining features of the present disclosure. Therefore, the present disclosure is not limited to the following drawings and descriptions.

Figure 1:
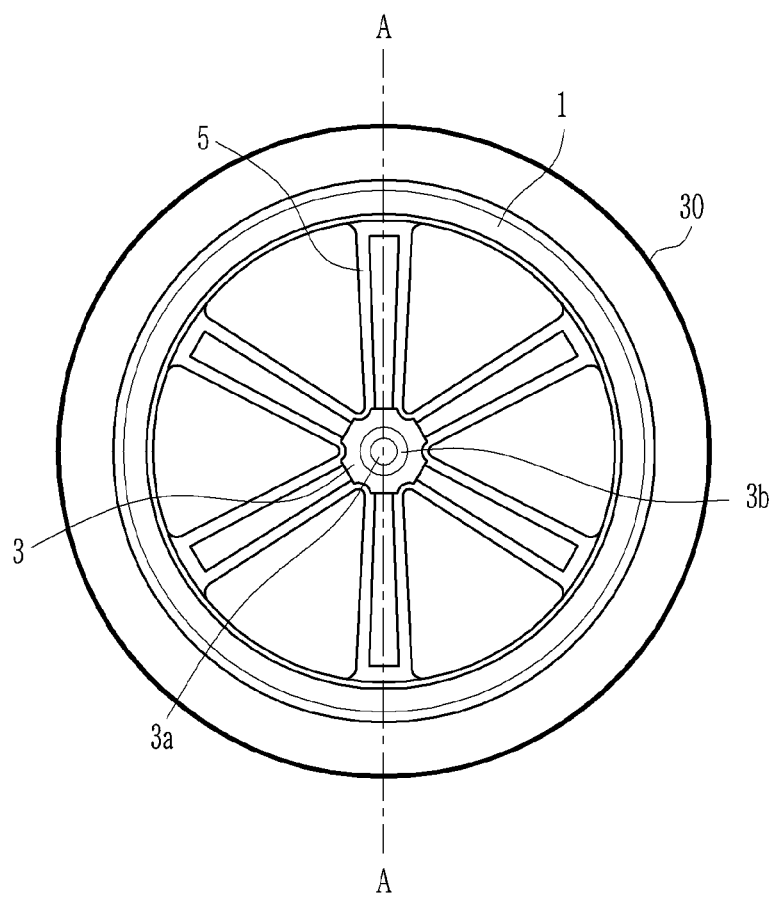
FIG. 1 is a top view of a bicycle wheel according to exemplary embodiments of the present disclosure.
Figure 2:
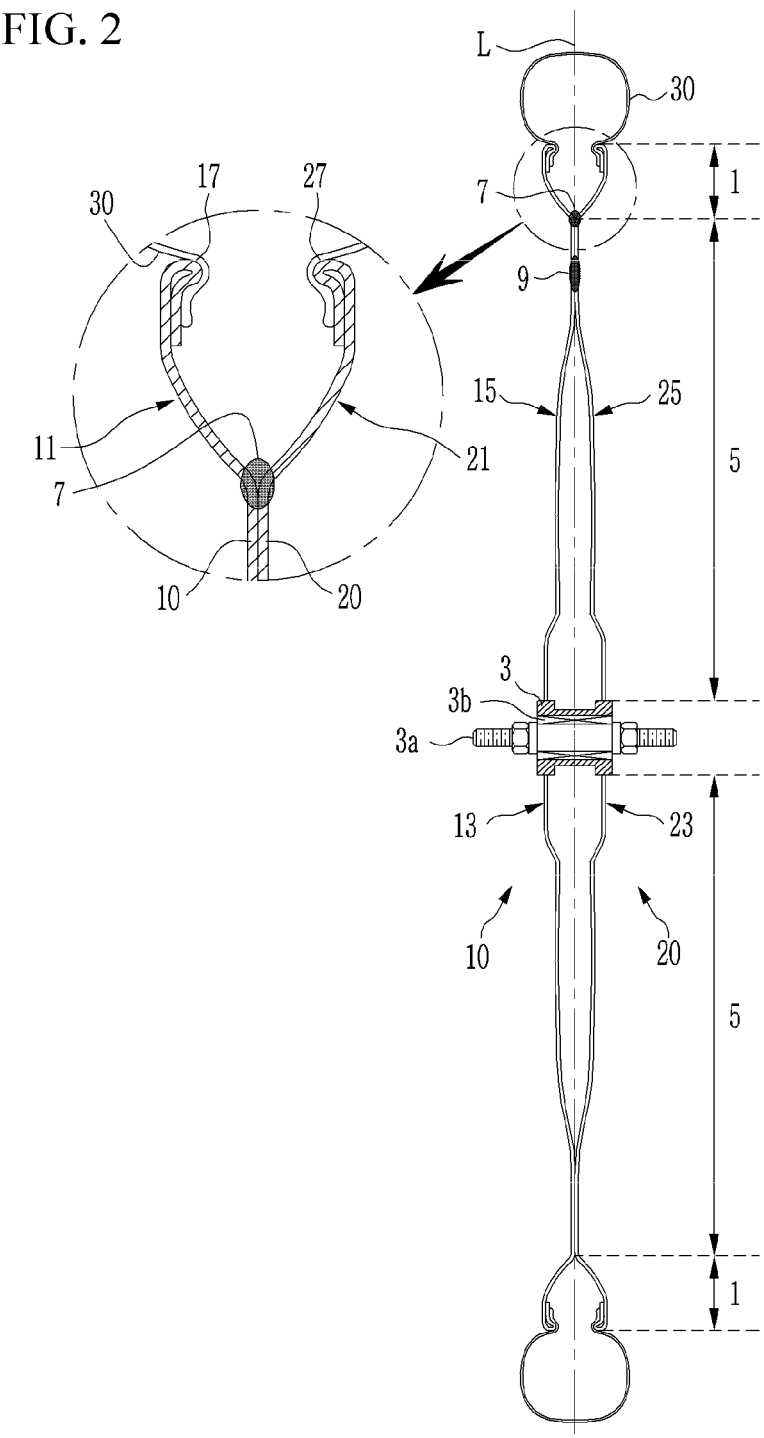
FIG. 2 is a cross-sectional view of the bicycle wheel of FIG. 1 taken along line A-A in FIG. 1.

FIG. 1 is a top view of a bicycle wheel according to exemplary embodiments of the present disclosure, and FIG. 2 is a cross-sectional view of the bicycle wheel of FIG. 1 according to some exemplary embodiments of the present disclosure taken along line A-A in FIG. 1.

Referring to FIGS. 1 and 2, the bicycle wheel according to exemplary embodiments of the present disclosure includes a rim 1 and a hub 3 connected to each other by a plurality of spokes 5, and a tire 30 mounted at an outer circumference of the rim 1.

The bicycle wheel, in some embodiments, is formed by joining a first panel member 10 and a second panel member 20 together so that the first panel member 10 and the second panel member 20 are symmetrical to each other, or are symmetrical to each other, or are mirror-images of each other, about a line passing through the hub 3 and a rim joint portion 7, and/or a line L passing through the hub 3 and the rim 1, and the line L may further substantially define a diameter of the rim 1.

The first panel member 10 includes a first rim portion 11 for mounting the tire 30 along an outer circumferential end of the first rim portion 11.

The first panel member 10 includes a first hub mounting end 13 which is disposed at a center of the first panel member 10 and connected to one side of the hub 3.

The hub 3 is coupled to one end of the first hub mounting end 13.

The first panel member 10 includes a first spoke portion 15 which connects the first rim portion 11 and the first hub mounting end 13.

The first panel member 10 includes a first clinching portion 17 which is formed by bending the first rim portion 11 in order to prevent the tire 30 from being withdrawn.

The second panel member 20 includes a second rim portion 21 formed to mount the tire 30.

The second panel member 20 includes a second hub mounting end 23 disposed at a center of the second panel member 20 and connected to the other side of the hub 3.

The hub 3 is coupled to one end of the second hub mounting end 23.

The second panel member 20 includes a second spoke portion 25 which connects the second rim portion 21 and the second hub mounting end 23.

The second panel member 20 includes a second clinching portion 27 formed by bending the second rim portion 21 in order to prevent the tire 30 from being withdrawn.

The bicycle wheel according to exemplary embodiments of the present disclosure is formed by joining the first panel member 10 and the second panel member 20 together.

As the first panel member 10 and the second panel member 20 are coupled to each other, the first rim portion 11 and the second rim portion 21 form the rim 1.

The first and second hub mounting ends 13 and 23 of the first and second panel members 10 and 20 are connected to the hub 3 at a rotation center.

A hub bearing 3b, which surrounds a wheel shaft 3a, is mounted in the hub 3.

Because configurations and functions of the hub 3 are obvious to those skilled in the art, a detailed description thereof will be omitted.

In addition, the first and second spoke portions 15 and 25 of the first and second panel members 10 and 20 form a spoke 5.

The six spokes 5 formed between the rim 1 and the hub 3 are illustrated, but the present disclosure is not limited thereto, and the number of spokes 5 may be changed as necessary.

The first panel member 10 and the second panel member 20 are joined together so that the first clinching portion 17 and the second clinching portion 27 protrude inward so as to face each other.

The bicycle wheel, which is configured as described above, includes a rim joint portion 7 which is formed between the first rim portion 11 and the first spoke portion 15 and between the second rim portion 21 and the second spoke portion 25, respectively, and joins the first panel member 10 and the second panel member 20 together.

The rim joint portion 7 may be coupled by applying a $CO_2$ welding joint method, although other suitable joining methods may be used.

Further, the bicycle wheel includes a panel joint portion 9 which is formed between the rim 1 and the hub 3 so as to join the first panel member 10 and the second panel member 20 together.

The panel joint portion 9 may be formed as a straight section at a set position between the rim 1 and the hub 3.

At least one joint method, including but not limited to, bolting, riveting, and spot welding, is applied to the panel joint portion 9.

Figure 3:
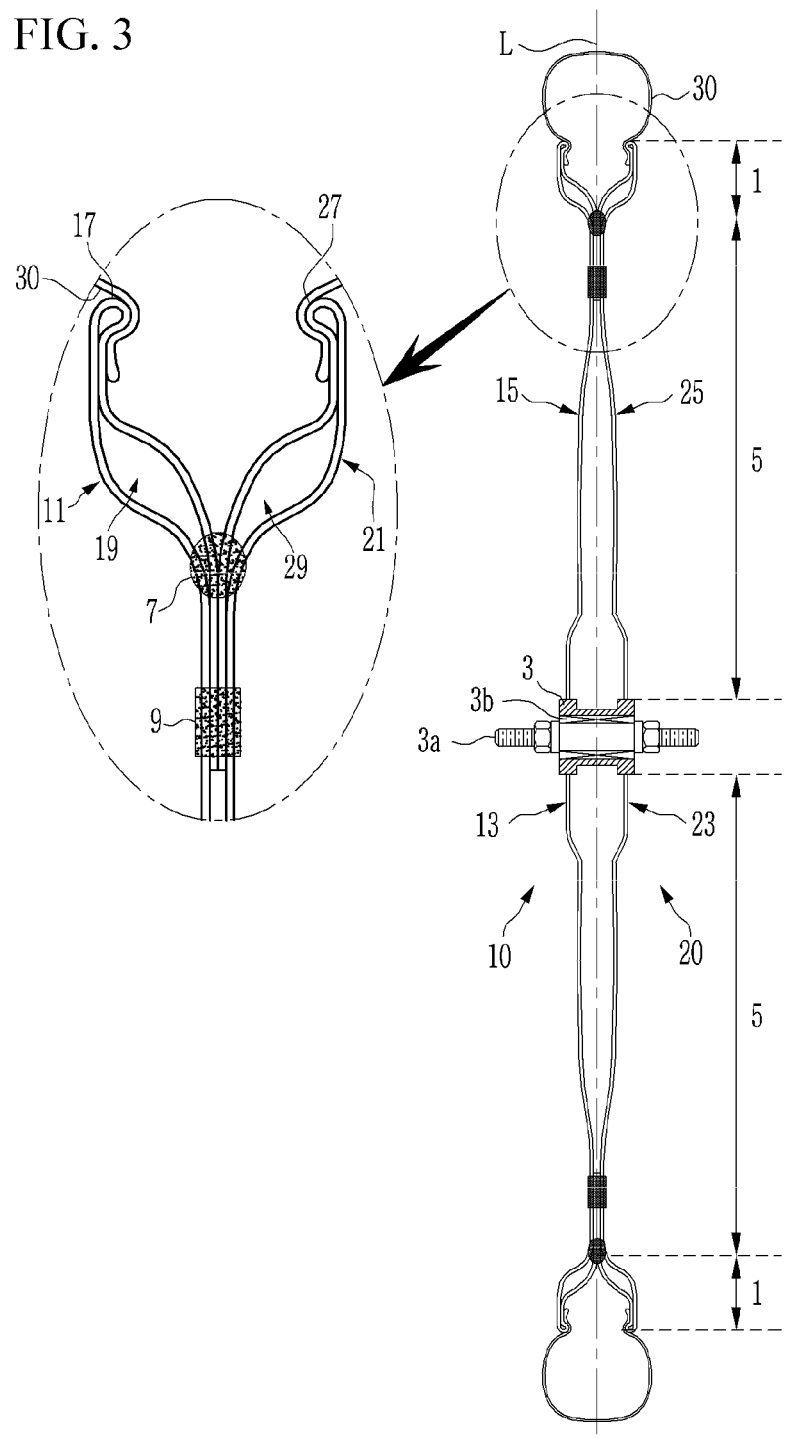
FIG. 3 is a cross-sectional view of another embodiment of the bicycle wheel of FIG. 1, different from that shown in FIG. 2, taken along line A-A of FIG. 1.

FIG. 3 is a cross-sectional view of another embodiment of the bicycle wheel of FIG. 1, different from that shown in FIG. 2, taken along line A-A in FIG. 1.

In the description of the bicycle wheel illustrated in FIG. 3, repeated description of the constituent elements identical to those of the bicycle wheel illustrated in FIG. 2 will be omitted for the convenience of understanding.

The bicycle wheel according to another exemplary embodiment of the present disclosure further includes first and second reinforcing portions 19 and 29 which are formed at positions, respectively, adjacent to the first and second rim portions 11 and 21 of the first and second panel members 10 and 20.

In the bicycle wheel according to another exemplary embodiment of the present disclosure, the first rim portion 11 has a dual panel structure formed by bending the first panel member 10, and in this state, the first reinforcing portion 19, which is spaced apart from the first rim portion 11 at a set interval, is formed in a set region of the dual panel structure.

That is, the first reinforcing portion 19 is extended and bent from the first rim portion 11, and a space is formed between the first rim portion 11 and the first reinforcing portion 19.

In the bicycle wheel according to another exemplary embodiment of the present disclosure, as shown in FIG. 3, the second rim portion 21 has a dual panel structure formed by bending the second panel member 20, and in this state, the second reinforcing portion 29, which is spaced apart from the second rim portion 21 at a set interval, is formed in a set region of the dual panel structure.

That is, the second reinforcing portion 29 is extended and bent from the second rim portion 21, and a space is formed between the second rim portion 21 and the second reinforcing portion 29.

The first reinforcing portion 19 and the second reinforcing portion 29 are applied to improve rigidity by forming the predetermined spaces in the first panel member 10 and the second panel member 20, respectively.

A rim joint portion 7, which joins the first panel member 10 and the second panel member 20 together, may be formed between the first rim portion 11 and the first spoke portion 15 and between the second rim portion 21 and the second spoke portion 25, and the first reinforcing portion 19 and the second reinforcing portion 29 may be extended into the rim joint portion 7 and coupled to each other.

The bicycle wheel includes the panel joint portion 9 which is formed between the rim 1 and the hub 3 so as to join the first panel member 10 and the second panel member 20 together.

The first reinforcing portion 19 and the second reinforcing portion 29 may be extended into the panel joint portion 9 and coupled to each other, thereby improving rigidity of the rim 1.

Figure 4:
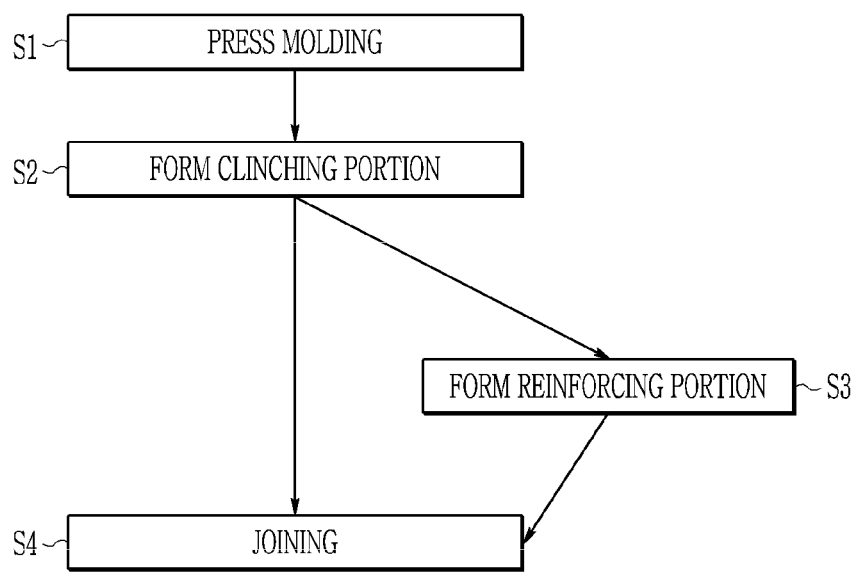
FIG. 4 is a flowchart illustrating a process of manufacturing a bicycle wheel according to exemplary embodiments of the present disclosure.

FIG. 4 is a flowchart illustrating a process of manufacturing the bicycle wheel according to exemplary embodiments of the present disclosure.

Referring to FIG. 4, in exemplary methods of manufacturing a bicycle wheel according to embodiments of the present disclosure, the first rim portion 11, the first hub mounting end 13, and the first spoke portion 15 are formed on the first panel member 10 by press molding, and the second rim portion 21, the second hub mounting end 23, and the second spoke portion 25 are formed on the second panel member 20 by press molding (S1).

Press molding is applied to the first panel member 10 and the second panel member 20 which deforms a shape of the panels by applying heat and pressure.

Next, the first clinching portion 17, which protrudes to one side along an outer circumference, is formed by bending the first panel member 10. In addition, the second clinching portion 27, which protrudes to one side, is formed by bending the second panel member 20 (S2).

The first and second clinching portions 17 and 27 may be formed on the first and second panel members 10 and 20, respectively, by at least one processing method among a cam press molding, a press curl hemming processing, and a roll hemming processing, but the present disclosure is not necessarily limited thereto and the first and second clinching portions 17 and 27 may be formed by other processing methods as necessary.

Next, the first panel member 10 and the second panel member 20 are joined together (S4).

In this case, as the first panel member 10 and the second panel member 20 are joined together, the rim 1 is formed by the first rim portion 11 and the second rim portion 21.

Here, the first clinching portion 17 and the second clinching portion 27 are disposed to protrude inward.

In addition, the first hub mounting end 13 and the second hub mounting end 23 are joined together and coupled to the hub 3 together with the wheel shaft 3a and the hub bearing 3b.

The spoke 5, which includes the first spoke portion 15 and the second spoke portion 25, is formed between the rim 1 and the hub 3.

Here, the first panel member 10 and the second panel member 20 are primarily joined together by means of the rim joint portion 7 formed at a lower end portion of the rim 1.

In this case, the $CO_2$ welding joint method may be applied to the rim joint portion 7, although another suitable joining method may also be used.

Further, the first panel member 10 and the second panel member 20 are joined together by means of the panel joint portion 9 formed in a set section between the rim 1 and the hub 3.

In this case, at least one joint method, among bolting, riveting, and spot welding, may be applied to the panel joint portion 9.

Meanwhile, the method of manufacturing the bicycle wheel according to another exemplary embodiment of the present disclosure may further include forming the first and second clinching portions 17 and 27 on the first and second panel members 10 and 20, respectively, and then forming the first and second reinforcing portions 19 and 29 at positions, respectively, adjacent to the first and second clinching portions 17 and 27, respectively (S3), in addition to the methods of manufacturing the bicycle wheel coupled to exemplary embodiments of the present disclosure as described above.

That is, the first reinforcing portion 19, which is bent from the first clinching portion 17 and spaced apart from the first rim portion 11 at a predetermined interval so as to form the space, is formed along an outer circumferential end of the first panel member 10.

In addition, the second reinforcing portion 29, which is bent from the second clinching portion 27 and spaced apart from the second rim portion 21 at a predetermined interval so as to form the space, is formed along an outer circumferential end of the second panel member 20.

In this case, the first reinforcing portion 19 and the second reinforcing portion 29 are formed at one side corresponding to the rim 1, thereby improving rigidity.

In the bicycle wheel according to exemplary embodiments of the present disclosure, the rim 1 and the spoke 5 are formed by press-molding each of the first panel member 10 and the second panel member 20 and then joining the first panel member 10 and the second panel member 20 together so that the first panel member 10 and the second panel member 20 are symmetrical to each other. Design and performance characteristics may be improved because of the simple manufacturing process, and manufacturing and assembling time and costs may be reduced.

In addition, in the case of the bicycle wheel, costs required for molds and manufacturing costs may be reduced in comparison with a technology of manufacturing a bicycle wheel using the existing casting molding using carbon or the like, thereby improving productivity.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:

1. A method of manufacturing a bicycle wheel, the method comprising:
   forming a first rim portion, a first hub mounting end, and a first spoke portion on a first panel member by press molding;
   forming a second rim portion, a second hub mounting end, and a second spoke portion on a second panel member by press molding;
   forming a first clinching portion and a second clinching portion, which each protrude to a side, by bending the first panel member and the second panel member;
   forming a rim with the first rim portion and the second rim portion by joining the first panel member and the second panel member together, mounting a hub to be coupled to the first hub mounting end and the second hub mounting end, and forming a spoke including the first spoke portion and the second spoke portion between the rim and the hub;
   forming a first reinforcing portion, which is spaced apart from the first rim portion, in a state in which the first clinching portion is formed by bending the first panel member; and
   forming a second reinforcing portion, which is spaced apart from the second rim portion, in a state in which the second clinching portion is formed by bending the second panel member.

2. The method of claim 1, wherein the first reinforcing portion and the second reinforcing portion are formed at positions proximate to, or forming, the rim.

3. The method of claim 1, wherein the first clinching portion and the second clinching portion are formed on the first panel member and the second panel member, respectively, by at least one processing method selected from the group consisting of cam press molding, press curl hemming processing and roll hemming processing.

4. The method of claim 1, wherein the first panel member and the second panel member are joined together such that the first clinching portion and the second clinching portion are disposed to protrude inward or towards each other.

5. The method of claim 1, further comprising:
   joining the first panel member and the second panel member together with a rim joint portion formed at a lower end portion of the rim; and
   joining the first panel member and the second panel member together with a panel joint portion formed in a set section between the rim and the hub.

6. The method of claim 5, wherein the first panel member and the second panel member are joined together and form the rim joint portion by $CO_2$ welding.

7. The method of claim 5, wherein the first panel member and the second panel member are joined together to form the panel joint portion by any one joint method selected from the group consisting of bolting, riveting and spot welding.

* * * * *